United States Patent [19]

Sakiyama et al.

[11] 4,221,686

[45] Sep. 9, 1980

[54] ULTRAVIOLET RADIATION CURABLE PRINTING INK

[75] Inventors: Kazuo Sakiyama, Ibaragi; Hiroshi Ota, Kawanishi; Hirosi Kato, Ibaragi, all of Japan

[73] Assignees: Sumitomo Chemical Company, Limited; Sakata Shokai Ltd., both of Osaka, Japan

[21] Appl. No.: 649,728

[22] Filed: Jan. 16, 1976

[30] Foreign Application Priority Data

Jan. 22, 1975 [JP] Japan .................................. 50-10033

[51] Int. Cl.$^2$ .................. C08L 63/10; C08L 91/00; C08G 18/04; C08F 2/48
[52] U.S. Cl. .................. 260/23 EP; 106/27; 204/159.19; 204/159.22; 260/22 TN; 260/23 TN; 260/33.6 EP; 260/33.6 UA; 260/42.21; 260/42.28; 525/528; 528/75
[58] Field of Search .................. 106/27; 260/77.5 R, 260/77.5 AN, 23 TN, 18 PT, 18 TN, 830 P, 835, 22 TN, 23 EP, 188 N; 204/159.22, 159.19; 525/528, 59.22; 528/75

[56] References Cited

U.S. PATENT DOCUMENTS

| | | | |
|---|---|---|---|
| 3,373,221 | 3/1968 | May | 260/23 TN X |
| 3,419,510 | 12/1968 | Hudak | 260/18 |
| 3,478,120 | 11/1969 | Turpin | 260/77.5 AN |
| 3,517,039 | 6/1970 | Wagner | 260/453 AB |
| 3,781,214 | 12/1973 | Nemoto et al. | 260/22 TN |
| 3,836,492 | 9/1974 | Watanabe et al. | 260/23 EP X |
| 3,856,757 | 12/1974 | Satomura | 528/75 |
| 3,864,133 | 2/1975 | Hisamatsu et al. | 204/159.19 X |
| 3,876,432 | 4/1975 | Carlick et al. | 204/159.19 X |
| 3,878,077 | 4/1975 | Borden et al. | 528/75 X |
| 3,891,523 | 6/1975 | Hisamatsu et al. | 204/159.19 X |
| 3,931,071 | 1/1976 | Trecker et al. | 260/23 EP X |
| 3,931,075 | 1/1976 | Trecker | 260/23 TN |
| 3,991,024 | 11/1976 | Nakamoto et al. | 106/27 X |
| 4,098,918 | 7/1978 | DeMajistre | 204/159.19 X |

*Primary Examiner*—Howard E. Schain
*Attorney, Agent, or Firm*—Stevens, Davis, Miller & Mosher

[57] ABSTRACT

An ultraviolet radiation polymerizable unsaturated compound containing a polymerizable unsaturated group which is obtained by reacting a reaction product (I) prepared by the reaction between a higher fatty acid having 8 or more carbon atoms or an unsaturated monobasic acid, or a mixture of the two, and a polyisocyanate compound containing at least two isocyanate groups in the molecule, with a reaction product (II) prepared by the reaction between an unsaturated monobasic acid or a higher fatty acid having 8 or more carbon atoms, or a mixture of the two, and an epoxy compound containing at least two epoxy groups in the molecule.

11 Claims, No Drawings

ULTRAVIOLET RADIATION CURABLE PRINTING INK

This invention relates to an ultraviolet radiation polymerizable unsaturated compound useful as an ultraviolet curable printing ink, and to a process for preparing the same.

In such printing as offset printing or letter press printing, there have heretofore been used such printing inks that the drying of the inks is carried out by penetration of drying oil, semi-drying oil, high boiling solvent or resin, and by absorption of oxygen in air with addition of an oxidative polymerization catalyst. For the drying of said inks, therefore, such a long time as several minutes to several hours is required. Particularly when the substrate to be printed is aluminum foil, metal plate, plastic film or the like material having no absorptive surface, no set-drying by penetration is effected so that such an extremely long drying time as several hours to ten and more hours is required. In order to prevent "set-off" or "blocking" derived from such long drying time, there has necessarily been adopted such procedures as racking, sprinkling a large amount of spray powder and airing. On the other hand, in the case of heat set type web-fed offset rotary printing or metal plate printing, the drying of the inks needs enormous space, high equipment cost and high energy for the drying oven. Further, most of the heat set type printing inks diffuse the solvents into air, and hence bring about many problems from the standpoint of air pollution and environmental sanitation.

In order to overcome various drawbacks derived from the use of such conventional printing inks, there have been developed ultraviolet radiation curable printing inks which can be cured within several seconds by irradiation of ultraviolet rays.

Conventional ultraviolet radiation curable printing inks containing esters of unsaturated acids are high in curing rate. Particularly, the reaction product of an unsaturated basic acid with an epoxy resin is high in curing rate and is excellent in storage stability. Accordingly, there has also been proposed an ultraviolet curable printing ink composed mainly of a mixture of the said reaction product and an ethylenically unsaturated monomer (Japanese Patent Laid Open Publication No. 21250/74).

The above-mentioned printing inks are excellent in drying property, but have drawbacks in that they are low in affinity with pigments, in general, cannot maintain proper consistency as inks, such as viscosity, elasticity, fluidity and the like, and give printed matter inferior in luster. Further, they are poor in washability with hydrocarbon type solvents which have heretofore been used in printing operations, so that ketone type, aromatic type or ester type solvents must necessarily be used as washing solvents. These solvents, however, damage not only rubber rollers and blankets but also the image area of offset printing plates to cause disadvantages in that the conventional materials for the printing machine become unusable. Furthermore, the reaction product of an unsaturated acid with an epoxy resin has free hydroxyl groups in its molecule, and hence is easily emulsified in a damping solution. Accordingly, in a printing operation using the damping solution, as in offset printing, it brings about poor durability to water to cause such troubles as poor transfer and scumming. Thus, the said reaction product has not been suitable for a varnish of printing inks.

An object of the present invention is to provide an ultraviolet polymerizable unsaturated compound having sufficient characteristics as a printing ink which can overcome the drawbacks of the conventional ultraviolet radiation curable printing inks; an ultraviolet curable varnish containing the said compound; and an ultraviolet curable printing ink containing the said varnish.

That is, the present invention provides an ultraviolet radiation polymerizable compound containing a polymerizable unsaturated group, which is obtained by reacting a reaction product (I) prepared by the reaction between a higher fatty acid having 8 or more carbon atoms or an unsaturated monobasic acid, or a mixture of the two, and a polyisocyanate compound containing at least two isocyanate groups in the molecule, with a reaction product (II) prepared by the reaction between an unsaturated monobasic acid or a higher fatty acid having 8 or more carbon atoms, or a mixture of the two, and an epoxy compound containing at least two epoxy groups in the molecular (at least one of the reaction products (I) and (II) containing an unsaturated monobasic acid residue). The invention also provides an ultraviolet curable varnish comprising the said ultraviolet polymerizable unsaturated compound either alone or in admixture with a photopolymerizable monomer and/or a photopolymerizable resin, a part of which may be replaced by various conventional oils, fats, resins or monomers. The invention further provides an ultraviolet curable printing ink comprising the said ultraviolet radiation curable varnish, at least one coloring matter, a photopolymerization initiator and other conventional additives.

The present invention is characterized in that the aforesaid reaction products (I) and (II) are reacted with each other to bond the free hydroxyl groups possessed by the reaction product (II) with the isocyanate groups possessed by the reaction product (I) to form at least one urethane linkage, thereby decreasing the content of free hydroxyl groups to enhance the resulting compound in water resistance during printing operation and, at the same time, a sufficient adoptability as a printing ink is imparted thereto by the introduction of higher fatty acid residue. The compound thus synthesized necessarily contains an ultraviolet radiation polymerizable unsaturated group in the molecule, so that it is high in curing rate by irradiation of ultraviolet rays, contains no component separated after curing unlike the case of a mere mixture of the reaction products (I) and (II), and is excellent also in dispersibility with pigments, body-pigments, etc. Moreover, the compound need not to be incorporated with large quantities of organic solvent or forcibly dried at elevated temperatures, and hence has such excellent characteristics that no problem due to volatilization of solvent is caused and ordinary hydrocarbon type solvents can be used at the time of washing after printing.

The present invention is explained in detail below.

An example of the reaction product (I) used in the present invention is a compound obtained by reacting a higher fatty acid having 8 or more carbon atoms selected from the group consisting of caprylic, nonanoic, lauric, palmitic, stearic, oleic, linoleic, linolenic and eleostearic acids, and fatty acids obtained from animal and vegetable oils and fats containing the said acids such as linseed oil, tung oil, dehydrated castor oil, soybean oil, safflower oil, coconut oil, etc., or an unsaturated monobasic acid such as acrylic, methacrylic or crotonic acid, or a mixture of the two acids, with a polyisocyanate compound having at least two isocyanate groups in the molecule such as tolylene diisocyanate, xylylene diisocyanate, lysine diisocyanate, hexamethylene diisocyanate, diphenylmethane diisocyanate or dimer acid diisocyanate, in such proportions that the ratio of number of the acid group to the isocyanate group becomes 1: about 1.5 to about 3.0, preferably 1:2 to 2.4, under such mild condition as 0° to 100° C., preferably 20° to 70° C., using as catalyst an amine such as triethylamine, N-ethylethyleneimine or N-ethylmorpholine, an organometallic compound such as dibutyltin laurate or cobalt benzoate, an alkali metal compound such as sodium propionate, or a radical initiator, if necessary in the presence of up to 3 times the amount of the reactants (total amount of the fatty acid, the monobasic acid or a mixture thereof) of an organic solvent such as acetone, ether, benzene, toluene or tetrahydrofuran, or up to 2 times the amount of the reactants of a polymerizable monomer such as trimethylolpropane triacrylate or methacrylate, pentaerythritol tri- or tetra-acrylate or methacrylate, diethylene glycol acrylate or methacrylate, coconut oil fatty acid-modified trimethylolpropane diacrylate or methacrylate, styrene or divinylbenzene in the presence of a thermal polymerization inhibitor. Favorable reaction products (I) include reaction products between oleic acid or a mixture thereof with acrylic acid, and tolylene diisocyanate, hexamethylene diisocyanate or xylene diisocyanate.

An example of the reaction product (II) is a compound obtained by reacting at least one of di- or triglycidyl type epoxy compounds, which has been synthesized by reaction of epichlorohydrin or methylepichlorohydrin with one member selected from the group consisting of bisphenol A, resorcinol, aniline, hydroxybenzoic acid, m-hydroxyaniline, o-cresol novolak, glycols, polyhydric alcohols and halogenated phenols, with the previously mentioned unsaturated monobasic acid or higher fatty acid having 8 or more carbon atoms, or a mixture of the two acids, in such proportions that the ratio of number of epoxy group to acid group becomes 1: about 0.8 to 1.2, preferably about 1:1, at a temperature of 60° to 170° C., preferably 80° to 150° C., in the presence of a catalyst such as triethylamine, triethanolamine, hexamethyl phosphoramide, p-toluenesulfonic acid or tetramethylammonium chloride, and a thermal polymerization inhibitor such as hydroquinone, 2-methylhydroquinone, hydroquinone monomethyl ether or p-benzoquinone. Favorable reaction products (II) include reaction products between acrylic acid and epoxy compounds prepared by reacting epichlorohydrin with bisphenol A, resorcinol or polyhydric alcohols.

The ultraviolet radiation polymerizable unsaturated compound referred to in the present invention can be easily synthesized by reacting the thus obtained reaction products (I) and (II) with each other, if necessary in the presence of the aforesaid organic solvent or polymerizable monomer, at a temperature of 0° to 100° C., preferably 20° to 80° C. In this case, the reaction products (I) and (II) should be so selected that at least one of them contains at least one unsaturated monobasic acid residue. The reaction ratio of (I) to (II) is freely variable according to the application purpose of the resulting ultraviolet radiation polymerizable unsaturated compound. In this case, not all of the residual hydroxyl groups of the reaction product (II) need necessarily be reacted, but it is not preferable, in general, to leave free isocyanate groups of the reaction product (I). This is because the isocyanate groups easily react with moisture in the air or with water at the time of printing to invite gelation or coagulation.

The ultraviolet radiation curable varnish referred to in the present invention is a compound comprising the thus obtained ultraviolet radiation polymerizable unsaturated compound either alone or in admixture with, as viscosity regulators, a photopolymerizable monomer such as trimethylolpropane triacrylate or methacrylate, pentaerythritol tri- or tetra-acrylate or methacrylate, diethylene glycol diacrylate or methacrylate, neopentyl glycol diacrylate or methacrylate, coconut oil fatty acid-modified trimethylolpropane diacrylate or methacrylate, styrene or divinylbenzene, and a photopolymerizable resin such as the aforesaid reaction product (II) or an unsaturated epoxy ester resin. If necessary, the varnish may be additionally incorporated with a non-polymerizable compound selected from vegetable oils, polymerized vegetable oils, rosin-modified phenol resins, rosin-modified ester resins, modified alkyd resins, p-toluenesulfonic acid amide formalin resin and petroleum resins. In this case, the ultraviolet radiation curable varnish contains at least 20% by weight of the ultraviolet radiation polymerizable unsaturated compound and at most 50% by weight of the non-polymerizable compound.

The ultraviolet radiation curable printing ink referred to in the present invention is prepared by adding to the thus obtained ultraviolet radiation curable varnish at least one coloring matter selected from organic pigments, inorganic pigments, body pigments and dyes which have been used hitherto, and then milling the resulting mixture. The temperature in this case is desirably not higher than 60° C. Further, in this case, a benzoin type polymerization initiator such as benzoin, benzoin methyl ether, benzoin ethyl ether or benzoin propyl ether, a benzophenone type polymerization initiator such as benzophenone or Michler's ketone, a halogenated sulfonyl type polymerization initiator such as chlorinated $\beta$-naphthalenesulfonyl or p-chlorobenzenesulfonyl, a quinone type polymerization initiator or a ketone type polymerization initiator, or a mixture thereof, is added as an ultraviolet radiation polymerization initiator to the ink in a proportion of 1 to 15% by weight. In case a drying oil, a semidrying oil or a fatty acid thereof is contained in the varnish, a drier composed of metallic soap of lead, manganese, cobalt, nickel or cerium, which has heretofore been used as an oxidative polymerization catalyst, may be added according to the amount of respective component. Further, in case the matter to be printed is paper or the like material having an absorptive surface, it is not objectionable that a high boiling hydrocarbon type solvent, which has heretofore been used, may be added as a viscosity regulator to the ink in a proportion of at most 5% by weight. Furthermore, waxes, plasticizers, etc. may be added to prepare ultraviolet radiation curable printing inks suitable for application purposes.

The present invention is illustrated in detail below with reference to examples.

EXAMPLE 1

0.65 Mole of Sumiepoxy ELA-128 (an epoxy resin obtained by the reaction of bisphenol A with epichlorohydrin, epoxy equivalent 184–194; produced by Sumitomo Chemical Co., Ltd.), 0.17 g. of 2-methylhydroquinone and 1.3 moles of acrylic acid were successively charged into a 500 ml. four-necked flask, and the resulting mixture was sufficiently stirred. Further, 1.7 g. of triethylamine was added, and the mixture was heated to 110° C. while taking care of heat generation. The mixture was continuously stirred at said temperature for about 4 hours, and when the acid value had become less than 7, the reaction was completed. The reaction product was quickly cooled to about 60° C. and was incorporated and diluted with 0.066 g. of 2-methylhydroquinone and 133 g. of trimethylolpropane triacrylate to obtain a pale yellow, transparent liquid having a viscosity of $Z_6$ to $Z_7$ (as measured by use of the Gardener-Hodt Bubble viscometer at 25° C.). This liquid was named the compound (a).

In the next place, 193 g. of trimethylolpropane triacrylate and 0.19 g. of p-benzoquinone were charged into a 500 ml. four-necked flask equipped with a cooling pipe, a thermometer and a dropping funnel, and the resulting mixture was stirred. Further, 0.55 mole of tolylene diisocyanate (composed of 80% of 2,4-isomer and 20% of 2,6-isomer) and 0.43 g. of trimethylamine were added, and the mixture was gradually heated with stirring to a temperature of 45° C. over a period of about 30 minutes. Into this mixture, a mixture comprising 0.5 mole of Lunac O-A (oleic acid; produced by Kao Soap Co., Ltd.) and 0.86 g. of triethylamine was dropped over a period of about 2 hours while maintaining the said temperature. Thereafter, the mixture was continuously stirred for about 1 to 2 hours while maintaining the temperature at 50° C., and when the content of free isocyanate groups had become 6%, the reaction was terminated, and the system was immediately cooled to 25° C. When the inner temperature had become 25° C., 225 g. of the reaction product was left in the flask, 200 g. of the above-mentioned compound (a) and 0.2 g. of p-benzoquinone were charged into the flask, and the resulting mixture was sufficiently stirred. Thereafter, the mixture was gradually heated to 50° C., reacted at said temperature for about 30 minutes, incorporated with 0.15% based on the total amount of the mixture of dibutyltin diacetate as a catalyst, and further incorporated, after 30 minutes, with the same amount of the said compound. Subsequently, the mixture was continuously stirred at said temperature for about 2 to 3 hours, and when the content of free isocyanate groups had become less than 0.3%, the reaction was completed to obtain a pale brown, transparent liquid having a viscosity of $Z_7$. This liquid was named the ultraviolet radiation polymerizable unsaturated compound (A).

EXAMPLE 2

0.8 Mole of Sumiepoxy ELR-130 (an epoxy resin obtained by the reaction of resorcinol with epichlorohydrin, epoxy equivalent 125–135; produced by Sumitomo Chemical Co., Ltd.) was charged into a 500 ml. four-necked falsk and then subjected to the same reaction as in Example 1, using 0.16 g. of p-benzoquinone, 1.6 moles of methacrylic acid and 1.6 g. of triethylamine, and when the acid value had become less than 13, the reaction was completed to obtain a pale yellow, transparent, viscous liquid having a viscosity of $Z_7$ to $Z_8$. This liquid was named the compound (b).

In the next place, 1.5 moles of tolylene diisocyanate was charged into a 500 ml. four-necked flask equipped with a cooling pipe, a thermometer and a dropping funnel, and was heated with stirring to a temperature of 40° C. over a period of about 30 minutes. Into this tolylene diisocyanate, a mixture comprising 3 g. of triethylamine and 1.5 moles of linseed oil fatty acid was dropped over a period of about 1.5 hours while maintaining the said temperature. The resulting mixture was continuously stirred for about 1 hour, and when the content of free isocyanate groups had become 10%, the reaction was terminated, and the system was immediately cooled to 25° C. When the inner temperature had become 25° C., 160 g. of the reaction product was left in the flask, 80 g. of the aforesaid compound (b) and 120 g. of coconut oil fatty acid-modified trimethylolpropane diacrylate were charged into the flask, and the resulting mixture was sufficiently stirred. Thereafter, the mixture was heated to 50° C. and continuously stirred at said temperature, and when the content of free isocyanate groups had become less than 0.3%, the reaction was completed to obtain a pale brown, transparent liquid having a viscosity of $Z_6$ to $Z_7$. This liquid was named the ultraviolet radiation polymerizable unsaturated compound (B).

EXAMPLE 3

The same reaction as in Example 1 was repeated, except that 2-methylhydroquinone was replaced by p-benzoquinone, and the reaction product was taken out as it was without dilution with trimethylolpropane triacrylate to obtain a pale yellow, transparent, high viscosity liquid. This liquid was named the compound (c).

In the next place, 1.1 moles of tolylene diisocyanate was charged into a 1 liter, four-necked flask. Into this tolylene diisocyanate, a mixture comprising 3 g. of triethylamine, 200 g. of hexanediol diacrylate and 1.1 moles of tung oil fatty acid was dropped under the same conditions as in Example 2. The resulting mixture was continuously stirred for about 1 hour, and when the content of free isocyanate groups had become 6.6%, the reaction was terminated, and the system was immediately cooled to 25° C. When the inner temperature had become 25° C., 102 g. of the reaction product was left in the flask, 132 g. of the aforesaid compound (c) and 100 g. of hexanediol dimethacrylate were charged into the flask, and the resulting mixture was sufficiently stirred. Thereafter, the mixture was heated to 50° C. and continuously stirred at said temperature, and when the content of free isocyanate groups had become less than 0.3%, the reaction was completed to obtain a pale brown, transparent liquid having a viscosity of $Z_6^+$. This liquid was named the ultraviolet radiation polymerizable unsaturated compound (C).

EXAMPLE 4

1.5 Moles of tolylene diisocyanate was charged into a 1 liter, four-necked flask, and was heated with stirring to a temperature of 40° C. over a period of about 30 minutes. Into this tolylene diisocyanate, a mixture comprising 3 g. of triethylamine and 1.5 moles of linseed oil fatty acid was dropped over a period of about 1.5 hours while maintaining the said temperature. The resulting mixture was continuously stirred for about 1 hour, and when the content of free isocyanate groups had become 10%, the reaction was completed to obtain a pale yellow, transparent liquid having a viscosity of $Z_6^+$.

In the next place, 146 g. of the thus obtained liquid, 94 g. of the aforesaid compound (c) and 120 g. of hexanediol diacrylate were charged into a 500 ml. three-necked flask, and the resulting mixture was sufficiently stirred. Thereafter, the mixture was gradually heated to 50° C. and continuously stirred at said temperature for about 2 hours, and when the content of free isocyanate groups had become less than 0.3%, the reaction was completed to obtain a pale brown, transparent liquid having a viscosity of $Z_6$ to $Z_7$. This liquid was named the ultraviolet radiation polymerizable unsaturated compound (D).

EXAMPLE 5

0.3 Mole of Sumiepoxy ELA-128, 0.7 mole of Denacol EX-810 (an ethylene glycol type epoxy resin, produced by Nagase Sangyo Co., Ltd.), 0.21 g. of 2-methylhydroquinone, 2 moles of acrylic acid and 2.1 g. of tetramethylammonium chloride were charged into a 1 liter, four-necked flask. The resulting mixture was reacted in the same manner as in the case of the compound (a) in Example 1, and when the acid value had become less than 13, the reaction was completed. The reaction product was quickly cooled to about 60° C., and then incorporated and diluted with 0.09 g. of 2-methylhydroquinone and 181 g. of trimethylolpropane triacrylate to obtain a pale brown, transparent liquid having a viscosity of W to X. This liquid was named the compound (d).

In the next place, the same operation as in Example 1 was effected, except that 137 g. of trimethylolpropane triacrylate, 0.14 g. of p-benzoquinone and 0.31 g. of trimethylamine were used. Thereafter, the same subsequent operation as in Example 1 was effected, except that 0.5 mole of Lunac 8-95 (caprylic acid produced by Kao Soap Co., Ltd.) and 0.62 g. of triethylamine were used in place of Lunac O-A. When the content of free isocyanate groups had become 9%, the reaction was terminated, and the system was immediately cooled to 25° C. When the inner temperature had become 25° C., 250 g. of the reaction product was left in the flask, and then 250 g. of the above-mentioned compound (d) and 0.25 g. of p-benzoquinone were charged into the flask. Thereafter, the same operation as in Example 1 was effected to obtain a pale brown, transparent liquid having a viscosity of $Z_6$ to $Z_7$. This liquid was named the ultraviolet radiation polymerizable unsaturated compound (E).

EXAMPLE 6

Example 5 was repeated, except that 0.5 mole of n-nonanoic acid was used in place of Lunac 8-95, to obtain a pale brown, transparent liquid having a viscosisty of $Z_6$ to $Z_7$. This liquid was named the ultraviolet radiation polymerizable unsaturated compound (F).

EXAMPLE 7

0.7 Mole of Sumiepoxy ELA-128, 0.3 mole of Denacol EX-810, 0.24 g. of 2-methylhydroquincne, 2 moles of acrylic acid and 2.4 g. of tetramethylammonium chloride were charged into a 1 liter, four-necked flask. The resulting mixture was reacted in the same manner as in the case of the compound (a) in Example 1, and when the acid value had become less than 7, the reaction was completed. The reaction product was quickly cooled to about 60° C., and then incorporated and diluted with 0.1 g. of 2-methylhydroquinone and 206 g. of trimethylolpropane triacrylate to obtain a pale brown, transparent liquid having a viscosity of $Z_5$ to $Z_6$. This liquid was named the compound (e).

In the next place, the same operation as in Example 1 was effected, except that 163 g. of trimethylolpropane triacrylate, 0.16 g. of p-benzoquinone and 0.36 g. of triethylamine were used. Thereafter, the same subsequent operation as in Example 1 was effected, except that 0.5 mole of coconut oil fatty acid and 0.72 g. of triethylamine were used in place of Lunac O-A. When the content of free isocyanate groups had become 7%, the reaction was terminated, and the system was immediately cooled to 25° C. When the inner temperature had become 25° C., 250 g. of the reaction product was left in the flask, and then 250 g. of the above-mentioned compound (e) and 0.25 g. of p-benzoquinone were charged into the flask. Thereafter, the same operation as in Example 1 was effected to obtain a pale brown, transparent liquid having a viscosity of $Z_6$ to $Z_7$. This liquid was named the ultraviolet radiation polymerizable unsaturated compound (G).

EXAMPLE 8

The same operation as in Example 1 was effected, except that 170 g. of trimethylolpropane triacrylate, 0.2 g. of p-benzoquinone, 0.5 mole of tolylene diisocyanate and 0.35 g. of triethylamine were used. Thereafter, the same subsequent operation as in Example 1 was effected, except that 0.25 mole of Lunac O-A, 0.2 mole of acrylic acid and 0.7 g. of triethylamine were used. When the content of free isocyanate groups had become 7%, the reaction was terminated, and the system was immediately cooled to 25° C. When the inner temperature had become 25° C., 270 g. of the reaction product was left in the flask, and then 250 g. of the aforesaid compound (d) and 0.25 g. of p-benzoquinone were charged into the flask. Thereafter, the same operation as in Example 1 was effected to obtain a pale brown, transparent liquid having a viscosity of $Z_6$ to $Z_7$. This liquid was named the ultraviolet radiation polymerizable unsaturated compound (H).

EXAMPLE 9

365 Grams of acetone and 0.84 mole of hexamethylene diisocyanate were charged into a 1 liter, four-necked flask equipped with a cooling pipe, a thermometer and a dropping funnel, and the resulting mixture was heated with stirring to a temperature of 45° C. over a period of about 30 minutes. Into this mixture, a mixture comprising 0.8 mole of linseed oil fatty acid and 2 g. of triethylamine was dropped over a period of about 2 hours while maintaining the said temperature. Thereafter, the mixture was continuously stirred at said temperature for about 1 to 2 hours, and when the content of free isocyanate groups had become 5.5%, the reaction was terminated, and the system was immediately cooled to 25° C. When the inner temperature had become 25° C., 340 g. of the reaction product was left in the flask, 200 g. of the aforesaid compound (c) and 0.2 g. of p-benzoquinone were charged into the flask, and the resulting mixture was sufficiently stirred. Thereafter, the same operation as in Example 1 was effected, and when the content of free isocyanate groups had become less than 0.3%, the reaction was completed, and the reaction product was incorporated and diluted with 0.2 g. of p-benzoquinone and 247 g. of trimethylolpropane triacrylate. Subsequently, volatile components contained in this compound were removed under reduced pressure to a content of less than 3% to obtain a pale brown, transparent liquid having a viscosity of $Z_6$ to $Z_7$. This liquid was named the ultraviolet radiation polymerizable unsaturated compound (I).

EXAMPLE 10

277 Grams of acetone, 0.42 mole of tolylene diisocyanate and 0.46 g. of triethylamine were charged into a 500 ml. four-necked flask equipped with a cooling pipe, a thermometer and a dropping funnel, and the resulting mixture was heated with stirring to a temperature of 45° C. over a period of about 30 minutes. Into this mixture, a mixture comprising 0.4 mole of Lunac O-A and 0.69 g. of triethylamine was dropped over a period of about 2 hours while maintaining the said temperature. Thereafter, the same reaction as in Example 1 was effected, and when the content of free isocyanate groups had become 5%, the reaction was terminated, and the system was immediately cooled to 25° C. When the inner temperature had become 25° C., 215 g. of the reaction product was left in the flask, 100 g. of the aforesaid compound (c) and 0.1 g. of p-benzoquinone were charged into the flask, and the resulting mixture was sufficiently stirred. Thereafter, the same operation as in Example 1 was effected, and when the content of free isocyanate groups had become less than 0.3%, the reaction was terminated, and the reaction product was incorporated and diluted with 0.03 g. of 2-methylhydroquinone and 54 g. of trimethylolpropane triacrylate. Subsequently, volatile components contained in this compound were removed under reduced pressure to a content of less than 3% to obtain a pale yellow, transparent liquid having a viscosity of $Z_7$. This liquid was named the ultraviolet radiation polymerizable unsaturated compound (J).

EXAMPLE 11

200 Grams of the ultraviolet radiation polymerizable unsaturated compound (A) was mixed with 150 g. of the compound (a) synthesized in Example 1 to obtain an ultraviolet radiation curable varnish (K) having a viscosity of $Z_6$ to $Z_7$.

EXAMPLE 12

300 Grams of the ultraviolet radiation polymerizable unsaturated compound (F) was mixed with 50 g. of the compound (c) synthesized in Example 3 to obtain an ultraviolet radiation curable varnish (L) having a viscosity of $Z_7^-$.

EXAMPLE 13

250 Grams of the ultraviolet radiation polymerizable unsaturated compound (I) was mixed with 100 g. of the compound (c) synthesized in Example 3 to obtain an ultraviolet radiation curable varnish (M) having a viscosity of $Z_7$.

EXAMPLE 14

200 Grams of the ultraviolet radiation polymerizable unsaturated compound (J) was mixed with 150 g. of the compound (a) synthesized in Example 1 to obtain an ultraviolet radiation curable varnish (N) having a viscosity of $Z_6$ to $Z_7$.

EXAMPLE 15

170 Grams of the ultraviolet radiation polymerizable unsaturated compound (E) was mixed with 80 g. of p-toluenesulfonic acid amide formalin resin and 100 g. of trimethylolpropane triacrylate to obtain an ultraviolet radiation curable varnish (O) having a viscosity of $Z_7$.

EXAMPLE 16

240 Grams of the ultraviolet radiation polymerizable unsaturated compound (G) was mixed with 40 g. of the compound (c) synthesized in Example 3, 40 g. of trimethylolpropane triacrylate and 40 g. of pentaerythritol tri- or tetra-acrylate to obtain an ultraviolet radiation curable varnish (P) having a viscosity of $Z_6^+$.

EXAMPLE 17

300 Grams of the ultraviolet radiation polymerizable unsaturated compound (B) was mixed with 36 g. of hexanediol diacrylate to obtain an ultraviolet radiation curable varnish (Q) having a viscosity of $Z_6$.

EXAMPLE 18

290 Grams of the ultraviolet radiation polymerizable unsaturated compound (C) was mixed with 45 g. of coconut oil fatty acid-modified trimethylolpropane diacrylate to obtain an ultraviolet radiation curable varnish (R) having a viscosity of $Z_5$.

EXAMPLE 19

290 Grams of the ultraviolet radiation polymerizable unsaturated compound (D) was mixed with 45 g. of hexanediol diacrylate to obtain an ultraviolet radiation curable varnish (S) having a viscosity of $Z_6$.

Comparative Example 1

200 Grams of p-toluenesulfonic acid amide formalin resin was heat-melted and then mixed with 175 g. of trimethylolpropane triacrylate to obtain a control varnish (X) having a viscosity of $Z_6$.

Comparative Example 2

280 Grams of the compound (c) synthesized in Example 3 was mixed with 70 g. of hexanediol diacrylate to obtain a control varnish (Y) having a viscosity of $Z_6$ to $Z_7$.

EXAMPLE 20

The ultraviolet radiation polymerizable unsaturated compounds (B), (C) and (D) obtained in Examples 2, 3 and 4 were individually incorporated with a photopolymerizable monomer and a pigment, sufficiently milled in a three-roll mill at below 60° C., and further incorporated with benzoinmethyl ether as a photopolymerization initiator. In the above manner, ultraviolet curable printing ink Nos. 1 to 12 were prepared. The names of blended materials and the blending proportions were as shown in Table I.

Each of the thus prepared inks was printed on art paper in a proportion of 0.15 cc/200 cm$^2$, using an RI-Tester manufactured by Akira Seisakusho Ltd., and immediately irradiated with a 250 W output, high pressure mercury lamp (Hi-Ark, produced by Ushio Electric Co.) at a height of 5 cm., and the time required for set-drying of the printing ink film was measured. The results obtained were as shown in Table I.

Table I

| Blending (wt %) | Ink No. | No. 1 | No. 2 | No. 3 | No. 4 | No. 5 | No. 6 | No. 7 | No. 8 | No. 9 | No. 10 | No. 11 | No. 12 |
|---|---|---|---|---|---|---|---|---|---|---|---|---|---|
| Benzidine Yellow | | 17 | | | | 17 | | | | 17 | | | |

Table I-continued

| Blending (wt %) | Ink No. | No. 1 | No. 2 | No. 3 | No. 4 | No. 5 | No. 6 | No. 7 | No. 8 | No. 9 | No. 10 | No. 11 | No. 12 |
|---|---|---|---|---|---|---|---|---|---|---|---|---|---|
| Pigment | Carmine 6B | | 20 | | | | 20 | | | | 20 | | |
| | Phthalocyanine Blue | | | 20 | | | | 20 | | | | 20 | |
| | Carbon black | | | | 18 | | | | 18 | | | | 18 |
| Ultraviolet radiation polymerizable unsaturated compound | (D) | 68 | 65 | 65 | 67 | | | | | | | | |
| | (C) | | | | | 68 | 65 | 65 | 67 | | | | |
| | (B) | | | | | | | | | 70 | 67 | 67 | 69 |
| Photopolymerizable monomer | Hexanediol diacrylate | 10 | 10 | 10 | 10 | | | | | 8 | 8 | 8 | 8 |
| | Coconut oil fatty acid-modified trimethylolpropane triacrylate | | | | | 10 | 10 | 10 | 10 | | | | |
| Photopolymerization initiator | Benzoin methyl ether | 5 | 5 | 5 | 5 | 5 | 5 | 5 | 5 | 5 | 5 | 5 | 5 |
| Set-drying time (sec) | | 1.5 | 1.5 | 2.0 | 3.0 | 1.0 | 1.0 | 1.5 | 2.5 | 1.5 | 1.5 | 2.0 | 3.0 |

EXAMPLE 21

The ultraviolet radiation curable varnishes (Q), (R) and (S) obtained in Examples 17, 18 and 19 were individually incorporated with a pigment, sufficiently milled in a three-roll mill at below 60° C., and further incorporated with benzoin methyl ether as a photopolymerization initiator to prepare ultraviolet curable printing ink Nos. 11, 7 and 3, respectively. On the other hand, the ultraviolet polymerizable unsaturated compound (A) obtained in Example 1 and the ultraviolet curable varnishes (K), (L), (M), (N), (O) and (P) obtained in Examples 11, 12, 13, 14, 15 and 16 were individually incorporated with a pigment, sufficiently milled in a three-roll mill at below 60° C., and further incorporated with a Michler's ketone-benzophenone mixture or benzoin methyl ether as a photopolymerization initiator to prepare ultraviolet radiation curable printing ink Nos. 13 to 19, respectively. The names of blended materials and the blending proportions were as shown in Table II.

Each of the thus prepared inks was subjected to printing with a sheet fed offset one-color printing machine (Pearl, manufactured by Color Metal Co.), using a presensitized printing plate under ordinary printing conditions, and was measured in printability and ultraviolet radiation curability by means of an ultraviolet irradiator (equipped with two ozoneless type high pressure mercury lamps; manufactured by Oak Co.) which had been connected to said machine. The results obtained were as shown in Table II.

Table II

| Blending (wt %) | Ink No. | No. 3 | No. 7 | No. 11 | No. 13 | No. 14 | No. 15 | No. 16 |
|---|---|---|---|---|---|---|---|---|
| Pigment Phthalocyanine Blue | | 20 | 20 | 20 | 20 | 20 | 20 | 20 |
| Ultraviolet radiation polymerizable unsaturated compound or ultraviolet radiation curable varnish | | S 75 | R 75 | Q 75 | A 70 | K 70 | L 70 | M 70 |
| Photopolymerization initiator | Benzoin methyl ether | 5 | 5 | 5 | — | — | — | — |
| | Benzophenone/Michler's ketone = 3/2 mixture | — | — | —10 | 10 | 10 | 10 | |
| Printability | Fluidity | Excellent | Excellent | Excellent | Excellent | Excellent | Excellent | Excellent |
| | Swelling of rubber blanket | " | " | " | " | " | " | " |
| | Emulsification (scumming) | " | Favorable | " | " | " | Favorable | Favorable |
| | Kerosene washability | Favorable | " | Favorable | " | Favorable | " | " |
| | Stability on machine | " | " | " | " | " | " | " |
| Curability | | Excellent | Excellent | Excellent | " | Excellent | Excellent | Excellent |

| | Ink No. | No. 17 | No. 18 | No. 19 | Control ink | |
|---|---|---|---|---|---|---|
| Blending (wt %) | | | | | No. 20 | No. 21 |
| Pigment Phthalocyanine Blue | | 20 | 20 | 20 | 20 | 20 |
| Ultraviolet radiation polymerizable unsaturated compound or ultraviolet radiation curable varnish | | N 75 | O 70 | P 75 | X 75 | Y 75 |
| Photopolymerization initiator | Benzoin methyl ether | 5 | — | 5 | 5 | 5 |
| | Benzophenone/Michler's ketone = 3/2 mixture | — | 10 | — | — | — |
| Printability | Fluidity | Excellent | Excellent | Excellent | Inferior | Somewhat Inferior |
| | Swelling of rubber blanket | " | " | " | " | " |
| | Emulsification (scumming) | Favorable | " | Favorable | " | Inferior |
| | Kerosene washability | " | Favorable | " | " | " |
| | Stability on machine | " | " | " | " | Somewhat inferior |
| Curability | | Excellent | Excellent | Excellent | " | Excellent |

What is claimed is:

1. An ultraviolet radiation polymerizable compound containing a polymerizable unsaturated group in the molecule which is obtained by reacting a reaction product (I) prepared by the reaction between a higher fatty acid having 8 or more carbon atoms or an unsaturated monobasic acid, or a mixture of the two, and a polyisocyanate compound containing at least two isocyanate groups in the molecule, with a reaction product (II) prepared by the reaction between an unsaturated monobasic acid or a higher fatty acid having 8 or more carbon atoms, or a mixture of the two, and an epoxy compound containing at least two epoxy groups in the molecule, at least one of the reaction products (I) and (II) containing an unsaturated monobasic acid residue, wherein the ratio of the number of the acid groups to the isocyanate groups in preparing product (I) is 1: about 1.5 to 3.0 and wherein the ratio of the number of the epoxy groups to the acid groups in preparing product (II) is 1: about 0.8 to 1.2.

2. The compound according to claim 1, wherein the fatty acid is selected from the group consisting of caprylic, nonanoic, lauric, palmitic, stearic, oleic, linoleic, linolenic and eleostearic acids, and fatty acids obtained from animal and vegetable oils and fats containing the said acids.

3. The compound according to claim 1, wherein the unsaturated monobasic acid is acrylic acid, methacrylic acid or crotonic acid.

4. The compound according to claim 1, wherein the polyisocyanate compound is tolylene diisocyanate, xylylene diisocyanate, lysine diisocyanate, hexamethylene diisocyanate, diphenylmethane diisocyanate or dimer acid diisocyanate.

5. The compound according to claim 1, wherein the epoxy compound is a compound prepared by reaction of ephichlorohydrin or methylepichlorohydrin with one member selected from the group consisting of bisphenol A, resorcinol, aniline, hydroxybenzoic acid, m-hydroxyaniline, o-cresol novolak, glycols, polyhydric alcohols and halogenated phenols.

6. The compound according to claim 1, wherein the reaction to obtain the reaction product (I) is effected at a temperature of 0° to 100° C.

7. The compound according to claim 1, wherein the reaction to obtain the reaction product (II) is effected at a temperature of 60° to 170° C.

8. The compound according to claim 1, wherein the reaction between the reaction products (I) and (II) is effected at a temperature of 0° to 100° C.

9. A method for producing an ultraviolet polymerizable compound, which comprises reacting a reaction product (I) prepared by the reaction between a higher fatty acid having 8 or more carbon atoms or an unsaturated monobasic acid, or a mixture of the two, and a polyisocyanate compound containing at least two isocyanate groups in the molecule, with a reaction product (II) prepared by the reaction between an unsaturated monobasic acid or a higher fatty acid having 8 or more carbon atoms, or a mixture of the two, and an epoxy compound containing at least two epoxy groups in the molecule, at least one of the reaction product (I) and (II) containing an unsaturated monobasic acid residue, wherein the ratio of the number of the acid groups to the isocyanate groups in preparing product (I) is 1: about 1.5 to 3.0 and wherein the ratio of the number of the epoxy groups to the acid groups in preparing product (II) is 1: about 0.8 to 1.2.

10. An ultraviolet radiation curable varnish comprising the ultraviolet radiation polymerizable compound of claim 1.

11. An ultraviolet radiation curable printing ink comprising the ultraviolet radiation curable varnish of claim 10.